(12) United States Patent
Alford

(10) Patent No.: US 9,064,434 B2
(45) Date of Patent: Jun. 23, 2015

(54) HOLDER APPARATUS FOR BEVERAGE CONTAINERS AND OTHER OBJECTS FOR USE WITH AN AIRPLANE CABIN WINDOW FRAME ASSEMBLY AND INSTALLATION METHOD FOR SAME

(76) Inventor: Donald Wilson Alford, Garland, TX (US)

( * ) Notice: Subject to any disclaimer, the term of this patent is extended or adjusted under 35 U.S.C. 154(b) by 710 days.

(21) Appl. No.: 13/229,712

(22) Filed: Sep. 10, 2011

(65) Prior Publication Data

US 2013/0062382 A1    Mar. 14, 2013

(51) Int. Cl.
| | |
|---|---|
| *B60R 9/00* | (2006.01) |
| *B23P 11/00* | (2006.01) |
| *G09F 23/00* | (2006.01) |
| *B60N 3/10* | (2006.01) |
| *B64C 1/14* | (2006.01) |
| *B64D 11/00* | (2006.01) |
| *G09F 23/06* | (2006.01) |
| *B64D 11/06* | (2006.01) |

(52) U.S. Cl.
CPC ....... *G09F 23/0091* (2013.01); *Y10T 29/49826* (2015.01); *B60N 3/103* (2013.01); *B60N 3/108* (2013.01); *B64C 1/1484* (2013.01); *B64D 11/00* (2013.01); *G09F 23/06* (2013.01); *B64D 11/0638* (2014.12)

(58) Field of Classification Search
CPC ........ B60N 3/103; B60N 3/108; B60N 3/107; B60N 2/4666; B64C 1/1484; G09F 23/0091; G09F 23/06; G09F 3/203; B60R 2011/0061; B60R 7/046; B60R 2011/0021; B60R 2011/0071; B60R 2011/0059; B60R 2011/00; B64D 11/00; B64D 2011/0679

USPC ........ 224/482, 571, 556, 555, 564, 277, 278, 224/926, 928, 281, 543, 560, 561, 545, 547, 224/0.5, 539, 544; 454/216; 296/153, 296/37.13; 297/411.22
See application file for complete search history.

(56) References Cited

U.S. PATENT DOCUMENTS

| | | | | |
|---|---|---|---|---|
| 2,832,498 | A | * | 4/1958 | Parsons .................... 220/481 |
| 3,151,649 | A | | 10/1964 | Mitchell, Jr. |
| 4,749,112 | A | | 6/1988 | Harper |
| 4,810,026 | A | | 3/1989 | Doane |
| 4,844,400 | A | | 7/1989 | Jasmagy, Jr. |
| 4,903,872 | A | | 2/1990 | Henricksen et al. |

(Continued)

FOREIGN PATENT DOCUMENTS

| | | |
|---|---|---|
| GB | 2223935 A | 4/1990 |
| GB | 2491420 A | 12/2012 |

*Primary Examiner* — Adam Waggenspack
*Assistant Examiner* — Matthew Theis
(74) *Attorney, Agent, or Firm* — Richard G. Eldredge

(57) ABSTRACT

A beverage container and object holder apparatus, and installation method, for use in conjunction with a preexisting airplane cabin window frame assembly for use preferably by passengers located in a window seat. The holder apparatus is mountable and dismountable from an airplane cabin window frame assembly utilizing preexisting window shade U-shaped slide channels located within an airplane cabin window frame assembly. Each holder apparatus is comprised of one or more receptacles, with optional attachable upper ends, where each receptacle and/or upper end has an opening for receiving a beverage container or other objects. The various holder apparatus embodiments provide for selective holder apparatus utilization based on the number of receptacles and proximity of an airplane cabin window to the location of a passenger window seat.

20 Claims, 13 Drawing Sheets

(56) References Cited

U.S. PATENT DOCUMENTS

| | | | |
|---|---|---|---|
| 5,174,534 A * | 12/1992 | Mitchell | 248/311.2 |
| 5,279,452 A | 1/1994 | Huynh | |
| 5,280,870 A | 1/1994 | Chick et al. | |
| 5,285,938 A * | 2/1994 | Fauchald | 224/482 |
| 5,489,055 A | 2/1996 | Levy | |
| 5,490,622 A | 2/1996 | Tardif | |
| 5,785,222 A | 7/1998 | Basso et al. | |
| 6,484,989 B1 * | 11/2002 | Connery | 248/311.2 |
| 6,606,996 B1 * | 8/2003 | Thornell et al. | 131/241 |
| 8,479,960 B2 | 7/2013 | Lopez-Apodaca | |
| 2003/0168486 A1 | 9/2003 | Adams | |
| 2005/0199770 A1 * | 9/2005 | Andrews | 248/311.2 |
| 2008/0190568 A1 * | 8/2008 | Schwarz et al. | 160/84.06 |
| 2009/0140023 A1 | 6/2009 | Noble | |
| 2012/0280014 A1 | 11/2012 | Lopez-Apodaca | |
| 2013/0298470 A1 | 11/2013 | Shkut | |

* cited by examiner

HOLDER APPARATUS FOR BEVERAGE CONTAINERS AND OTHER OBJECTS FOR USE WITH AN AIRPLANE CABIN WINDOW FRAME ASSEMBLY AND INSTALLATION METHOD FOR SAME

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

A. Field of the Invention

The present invention relates generally to a holders used to store beverage containers and other objects while a passenger is traveling on an airplane. In particular, this invention relates to a holder apparatus used to store beverage containers and other objects that are suitable for use in places where there is not much room for such holders. Even more particularity, the present invention relates to such holders that are useful for mounting to preexisting airplane cabin window frame assemblies and an installation method for same.

B. Background

A conventional passenger airplane cabin has many rows of seat assemblies where a typical airplane seat assembly includes an airplane seat and a tray table. It has been the conventional practice on passenger airplanes to provide a seat tray table which may be supported from a structure so that beverage containers or other objects can be supported and positioned for manual retrieval and immediate use.

In connection with most airplane seats, there are two widely used types of airplane seat tray tables, one being attached to a passenger seat back and one which pivots out from a vertical storage compartment typically located beneath a passenger seat arm rest.

The first type of passenger tray table is provided on the back side of the seat back which is directly in front of a passenger. The tray table is moved between its stowed position and its use position by the passenger sitting in the seat behind the airplane seat assembly. When the tray table is in its use position, its upper surface is generally horizontal and is spaced rearward of the back portion of the airplane seat where it is stored. When the tray table is in its stowed position, its upper surface is adjacent to and facing the back portion of the airplane seat where it is stored.

The second type of passenger tray table is provided in a compartment beneath a passenger seat arm rest and is moved between a stowed position to a use position by a person sitting in the same airplane seat assembly where the arm rest compartment and tray table are located.

When either of the aforementioned tray tables is in a use position the upper surface is generally horizontal, is positioned over the passengers lap, and only provides a flat surface. Such flat surfaces allow objects to slide across or fall off the tray table. Some tray tables provide a shallow circular indentation positioned on one corner of the top surface to prevent a beverage container from sliding across the tray table. This circular indentation does not prevent the beverage container from tipping over, in the event an airplane should encounter turbulence or any sort of uneven flight, thus spilling the container contents onto the tray table, onto a passenger, or onto the floor. Overall, both the aforementioned seat tray table types are of limited size and therefore provide insufficient surface area to simultaneously support a food tray or work materials in addition to one or more beverage containers or other objects.

A disadvantage associated with these types of conventional tray tables is they are the only viable place for a passenger to place one or more beverage containers or other objects. Another disadvantage is associated with the difficulties and problems encountered when employing tray tables on the back of airplane seats. These difficulties generally occur when the tray table has been deployed into a use position and the person sitting in the tray table mounted seat activates the seat back into a different position. Such activation causes the seat back to move either forward or rearward so that any food or drink on the tray table may spill and other objects are prone to fall off. In instances where a hot beverage is involved, serious injury may occur to the person sitting behind the moved seat back.

Also, other instances occur when a seated passenger must move the tray table to the stowed position on the seat back which necessitates one or more beverage containers or other objects to be disposed of or be held in one or both hands. Such a procedure is dangerous in the event an airplane should encounter turbulence or any sort of uneven flight. To complicate matters more, a passenger will sometimes be offered a beverage container, such as a cup, in addition to another beverage container such as a canned drink, thus requiring space for two beverage container items. As such, it is not uncommon for a passenger to be left holding one or more beverage containers in one or both hands when tray tables are required to be placed in a stowed position prior to take off and landings.

Also, passengers frequently use their tray table as a work area for supporting reading or writing materials, hand-held devices, or personal computers. Because of the limited area of the tray table, a passenger generally cannot support one or more beverage containers or other objects while using the tray table as a work area. As a result, the passenger must generally remove his or her work materials from the tray table if he or she desires a beverage or risk having the beverage spill on the materials.

Moreover, many passengers find their passenger compartments to be somewhat confining when a tray table is in its use position, because the tray table limits the degree to which one can shift or move within the compartment. For example, it is difficult for passengers to cross their legs when their tray table is in the use position. Thus, if the passenger desires to maximize the space of the passenger compartment, he or she must generally hold one or more beverage containers or other objects in one or both hands and keep the tray table in its stowed position.

Also, should a passenger desire to leave their seat during flight, the passenger must first place the tray table back to the stowed position and dispose of all beverage containers or take the beverage containers with them as they ingress and egress through the seat aisle. As such, this poses a risk of spilling the beverage on other passengers.

Overall, prior art for airplane cabin beverage container holders and other object holders fail to address the traveler's specific need to safely and securely hold beverage containers or other objects and simultaneously provide sufficient workspace during transit. In view of the foregoing, a long-standing need has existed to provide a holder apparatus for beverage containers and other objects that may be supported in a different location other than relying on a conventional airplane seat tray table.

What is needed in the art of airplane cabin beverage and object holding devices is a simplified apparatus to safely and securely hold one or more beverage containers or other objects in such a way to prevent items from falling onto the floor or from spilling liquid, to free up tray table space to allow room for a work space, to free up one or both hands of a passenger for other use, to maximize the space of the passenger compartment, and to allow a passenger to conveniently leave their seat without being required to dispose of or hold their beverages or other objects in one or both hands.

SUMMARY OF THE INVENTION

In view of the foregoing disadvantages inherent in the prior art, the holder apparatus for beverage containers and other objects of the present invention provides the benefits and solves the problems identified above. Specifically, the present invention discloses a novel and relatively easy to use holder apparatus for use with an airplane cabin window frame assembly, and as such the present invention provides a benefit and safe convenience for those passengers who are utilizing a seat adjacent to an airplane cabin window.

Throughout this document, the meaning of "beverage container" or "other objects" is used in a broad sense. The meaning of "beverage container" implies drinking vessels such as cups with or without handles, beverage cans, beverage bottles, or any other type of container which holds liquid and the container can be comprised of plastic, glass, or any other type of material that can hold liquid. Additionally, the meaning of "other objects" implies objects such as food items, transportation tickets, writing instruments, small pocket books, or portable hand-held devices such as music players, computing devices, communication devices such as mobile telephones, cameras or video devices, or the like.

The holder apparatus described for the patent application herein is designed to conveniently mount to a preexisting airplane cabin window frame assembly, without physical modification to the airplane, by utilizing preexisting window frame window shade U-shaped slide channels. Window shade U-shaped slide channels are currently integrated into the left and right vertical walls of an airplane window frame and are provided to hold, support, and guide the left and right window shade frame edges during up and down slide motion. The holder apparatus invention described herein mounts within the U-shaped slide channels located below the preexisting window shade frame.

All of the embodiments of the present invention described in this specification are directed to a holder apparatus which is comprised of one or more open-top receptacles and a window frame mounting member all forming a single unit. Each open-top receptacle is large enough to accommodate a wide variety of large objects and/or beverage container sizes and shapes including cups with a handle. In addition, each open-top receptacle will also accept a removable upper end which is comprised of a secondary open-top lined with a gripping material, such as rubber or covered foam, permitting cups of various sizes which are presently provided by airlines, including cups with a handle, to be securely held in the event an airplane should encounter turbulence or any sort of uneven flight. The holder apparatus may also be manufactured with the upper end as a fixed attachment.

The holder apparatus described herein optionally includes frictional slider material located along each left and right end of the window frame mounting member. The frictional slider material, in combination with the window frame assembly window shade U-shaped slide channels, enables the holder apparatus to be vertically positioned within the window frame yet maintain the holder apparatus in any desired position.

A second embodiment of the present invention is provided to accommodate preexisting types of airplane window frames which are comprised of an extended window shade guides which extend below the lower edge of the window shade and reside within each window shade left and right U-shaped channel.

A third embodiment of the present invention is provided and is comprised of a single receptacle positioned on the left side of the holder apparatus. One use of the third embodiment is for a passenger sitting on the left side of the airplane cabin where a passenger window is in closer proximity to the seat located in front of the holder apparatus user. A second use for the third embodiment is for a passenger sitting on the right side of the airplane where the main passenger window is in a closer proximity to, and to the immediate right of, the holder apparatus user and added body space above the passenger arm rest is required.

A fourth embodiment of the present invention is provided and is comprised of a single receptacle positioned on the right side of the holder apparatus. One use of the fourth embodiment is for a passenger sitting on the right side of the airplane cabin where a passenger window is in closer proximity to the seat located in front of the holder apparatus user. A second use for the fourth embodiment is for a passenger sitting on the left side of the airplane where the main passenger window is in a closer proximity to, and to the immediate left of, the holder apparatus user and added body space above the passenger arm rest is required.

The holder apparatus invention described herein includes an installation method which requires no modification to the airplane.

Among the many advantages of all embodiments of the present invention is to provide a novel, new, and easy to install holder apparatus for beverage containers or other objects which overcomes the many disadvantages of a conventional airplane seat tray table.

Accordingly, the primary objective of the present invention to provide a novel and new holder apparatus which will hold one or more beverage containers or other objects when used in conjunction with a preexisting airplane cabin window frame assembly.

It is also an important objective of the present invention to provide a holder apparatus wherein each receptacle opening and/or upper end will accommodate a variety of beverage container or personal object sizes.

It is also an important objective of the present invention to provide a holder apparatus which includes gripping means for releasably holding beverage containers or other objects in place on the holder apparatus.

It is also an important objective of the present invention to provide a novel and new holder apparatus which is of relatively simple construction.

It is also an important objective of the present invention to provide a novel and new holder apparatus where the holder apparatus is exceedingly easy to install on a preexisting airplane cabin window frame assembly.

It is also an important objective of the present invention to provide a novel and new holder apparatus which requires no physical modification to the airplane for use.

It is also an important objective of the present invention to provide a holder apparatus which does not obstruct reclining passenger seat backs and where reclining passenger seat backs will not interfere with the holder apparatus or its contents.

It is also an important objective of the present invention to provide holder apparatus which mounts to an airplane cabin window frame assembly where the window shade may be lowered to rest on top of the mounted holder apparatus to reduce light into the cabin from outside the airplane.

It is also an important objective of the present invention to provide a novel and new holder apparatus which is removable, easy to remove, portable, and easy to transport because the holder apparatus is relatively small, lightweight, and consumes very little passenger space.

It is also an important objective of the present invention to provide a novel and new holder apparatus that is adaptable for displaying visible promotional material such as passenger information, company name, advertisements, logos, or decorative images.

The above and other objectives of the present invention will be explained in greater detail by reference to the figures and the description of the preferred embodiment which follows. As set forth herein, the present invention resides in the novel features of form, construction, usages, mode of operation, and combination of parts presently described and understood by the claims.

BRIEF DESCRIPTION OF THE DRAWINGS

The following drawings further describe by illustration the advantages and objects of the present invention. Each drawing is referenced by corresponding figure reference characters within the "DETAILED DESCRIPTION OF THE INVENTION" section to follow. The features of the present invention, which are believed to be novel, are set forth with particularity in the appended claims. The present invention, both as to its organization and manner of operation, together with further objects and advantages thereof, may best be understood with reference to the following description, taken in connection with the accompanying drawings in which:

DETAILED DESCRIPTION OF THE INVENTION

Figure 1:
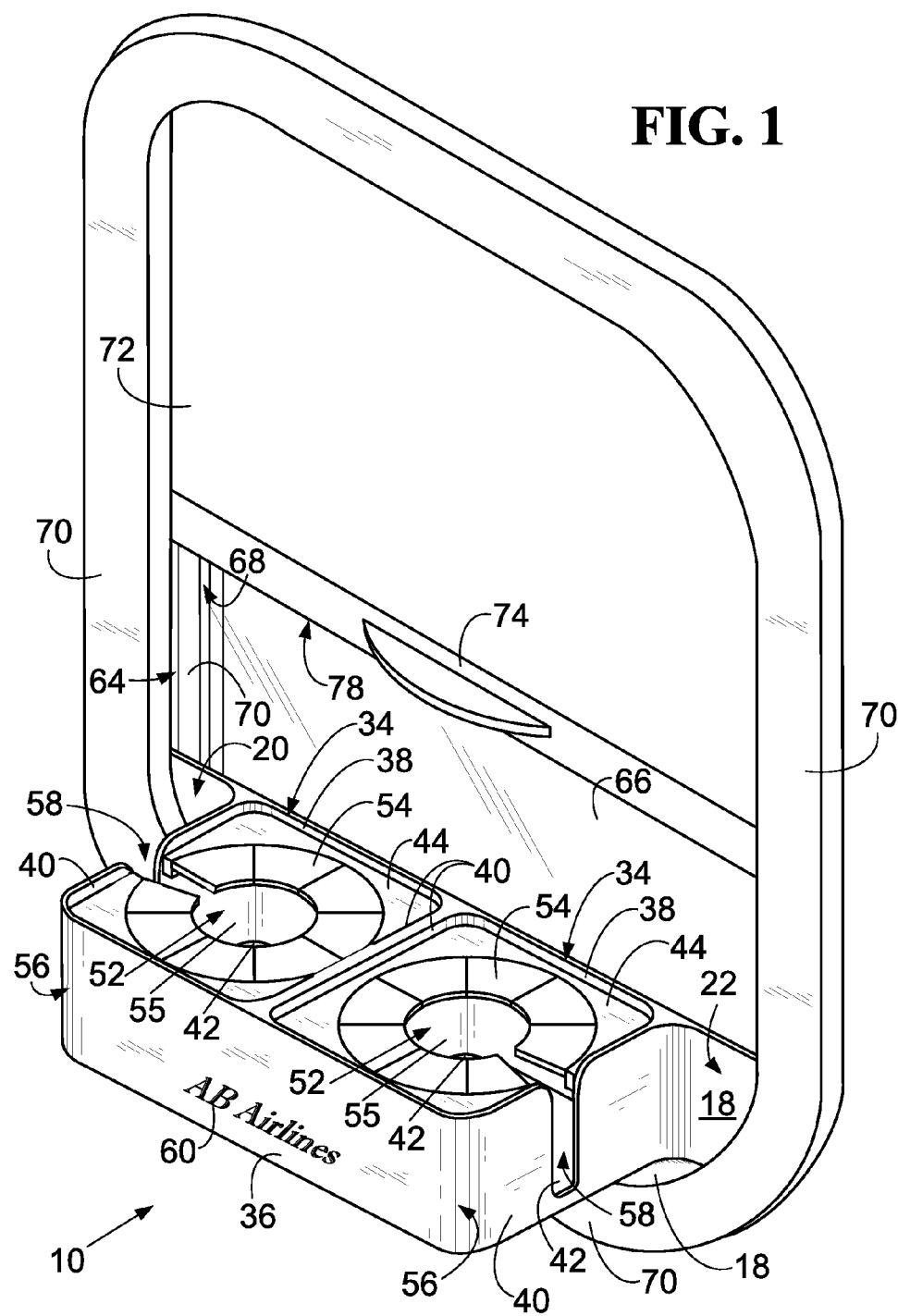
FIG. 1 is a perspective view of the first embodiment of the holder apparatus in the use position mounted to an airplane cabin window frame assembly with a window shade left U-shaped slide channel in view.

This detailed description of the following holder apparatus embodiments is intended to be read in connection with the accompanying drawings which are to be considered part of the entire written description of the present invention. The drawing figures are not necessarily to scale and certain features of the present invention may be shown exaggerated in scale in the interest of clarity and conciseness.

With reference to the figures, corresponding reference characters indicate corresponding like elements throughout the several views of the drawings. The enclosed drawings are merely illustrative of several embodiments and present several different ways of configuring the present invention. Although specific configurations, materials, configurations and uses are illustrated and described, it should be understood that a number of variations to the components and to the configuration of those components described herein and in the accompanying figures can be made without changing the scope and function of the invention set forth herein.

The presently claimed invention envisions any one of several presented embodiments, all of which provide a holder apparatus for holding beverage containers or other objects which can be permanently or temporarily mounted to a pre-existing airplane cabin window frame assembly. The distinguishing difference between the several embodiments presented herein is the number of receptacles per holder apparatus and/or the location of one or more receptacles on a holder apparatus, and/or the type mounting member used for mounting the holder apparatus to an airplane window frame assembly. All embodiments described herein, are designed primarily for the convenience and use for passengers who are sitting next to a window on either the left or right side of an airplane cabin.

Figure 2:
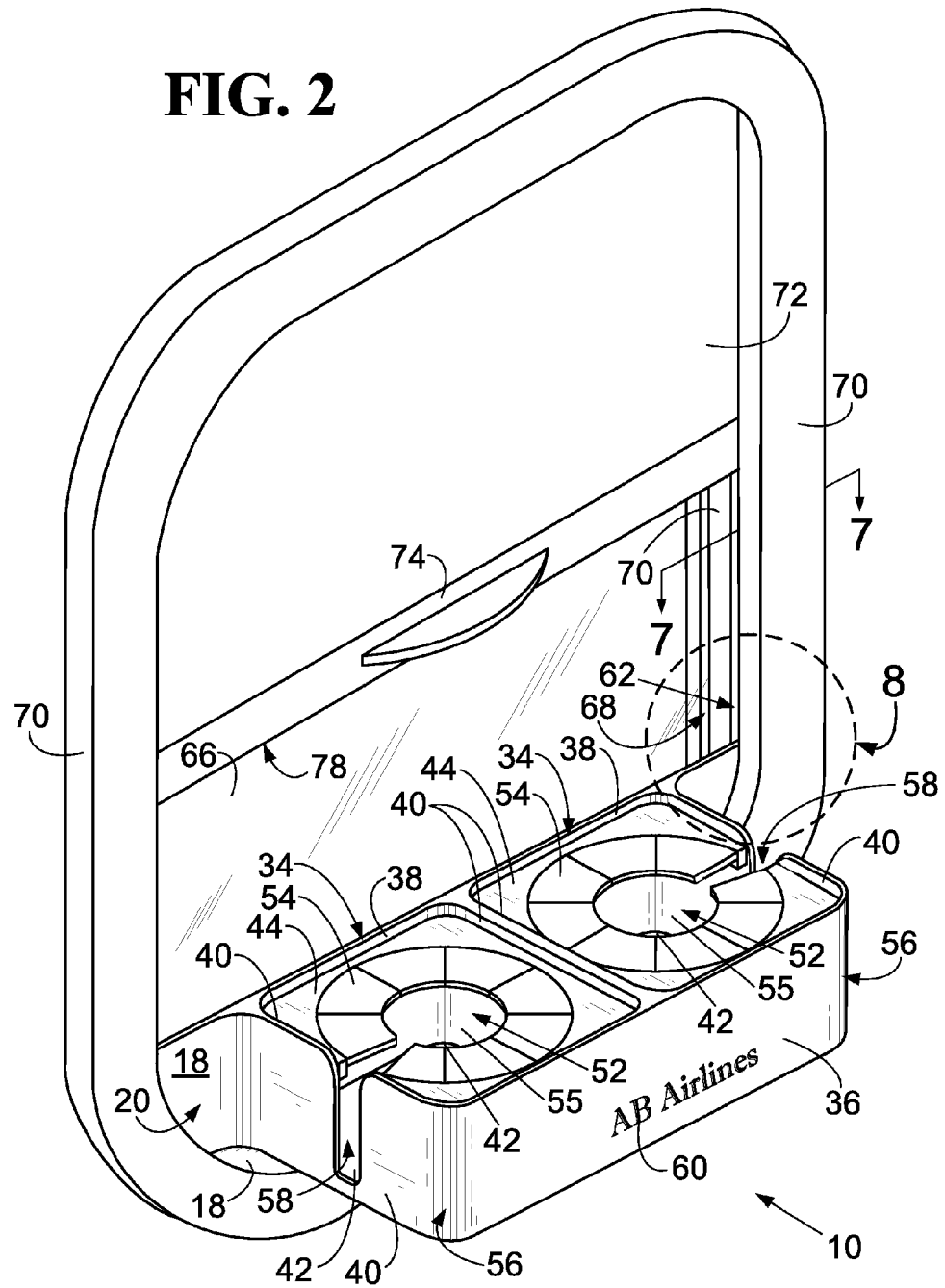
FIG. 2 is a perspective view of the first embodiment of the holder apparatus in a use position mounted to an airplane cabin window frame assembly with a window shade right U-shaped slide channel in view.
Figure 7:
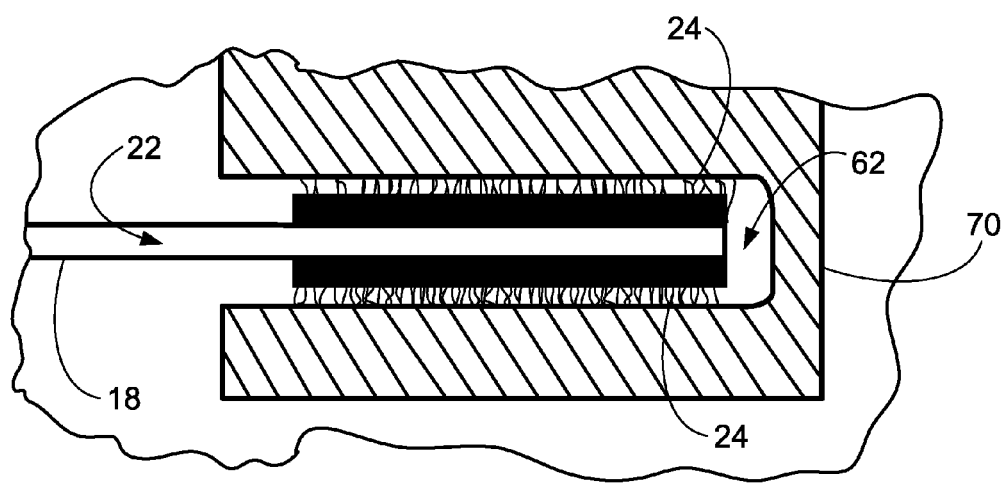
FIG. 7 is an enlarged cross-sectional view of the holder apparatus taken on line 7-7 in FIG. 2.
Figure 8:
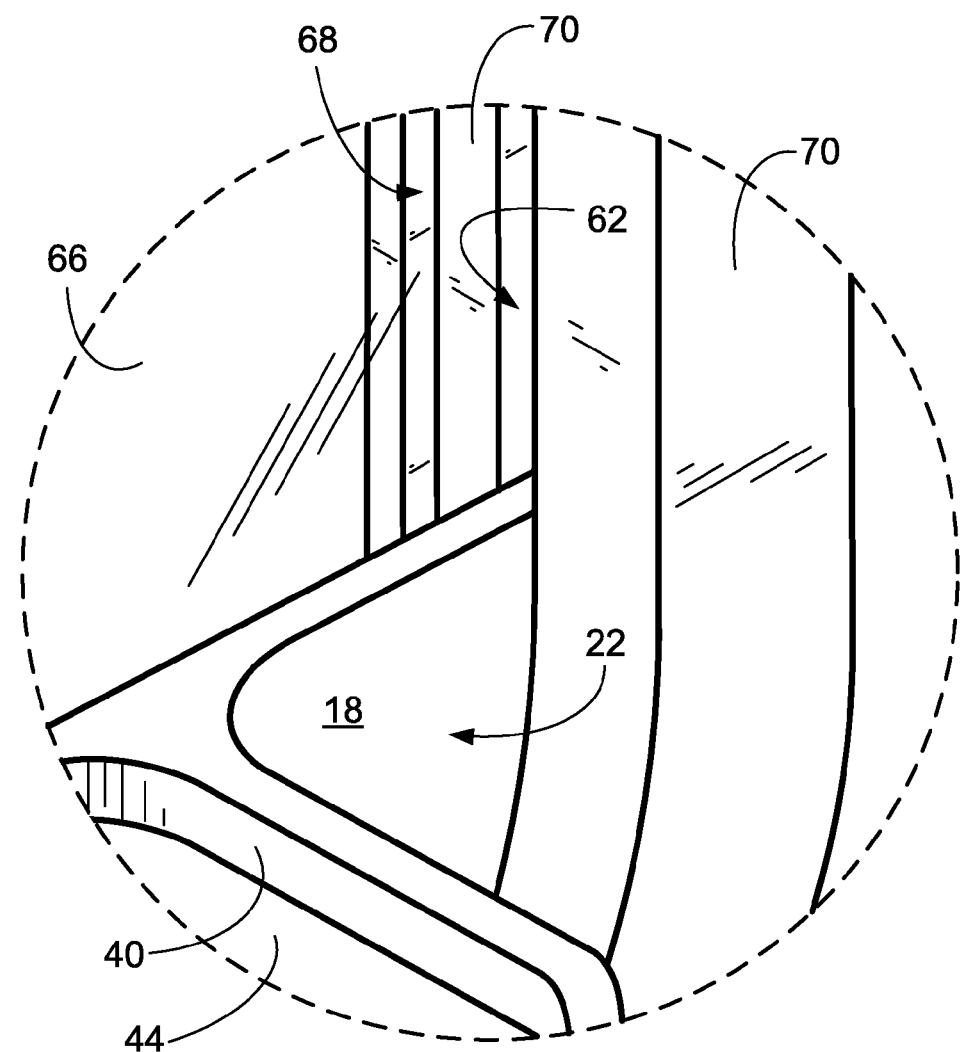
FIG. 8 is an enlarged view of portions of the holder apparatus taken at view 8 of FIG. 2.

Referring to FIGS. 1 and 2, the first embodiment of the present invention, generally designated with the number 10, is illustrated is a use position within a conventional airplane cabin window frame assembly. FIGS. 1 and 2 are identical in functional content except FIG. 1 provides a view of airplane window shade left U-shaped slide channel 64 and FIG. 2 shows a view of window shade right U-shaped slide channel 62 along with references to greater detail later described in FIGS. 7 and 8.

Although not part of the present claimed invention, a conventional airplane cabin window frame assembly is shown in FIGS. 1 and 2 to illustrate holder apparatus 10 in a use position and to support the detailed description of holder apparatus 10 that follows. To provide the reader some points of reference, and appreciated by those skilled in the art of conventional passenger airplane cabin window frame assemblies, some airplane cabin window frame assembly components are illustrated and identified for the purpose of reference and clarity with respect to the invention described herein. More specifically, illustrated are a airplane cabin window frame 70, inner window pane 66, inner window pane mount channel 68, window shade 72, window shade fame with handle 74, window shade leading edge 78, window shade left U-shaped slide channel 64 (in FIG. 1), and a window shade right U-shaped slide channel 62 (in FIG. 2). Both left and right U-shaped slide channels 64, 62 are integral components within window frame 70 located on a typical airplane window frame assembly. On a conventional airplane window frame assembly, window shade 72 is typically moved up and down within left and right U-shaped slide channels 64, 62 by a passenger using the window shade frame with handle 74.

Figure 3:
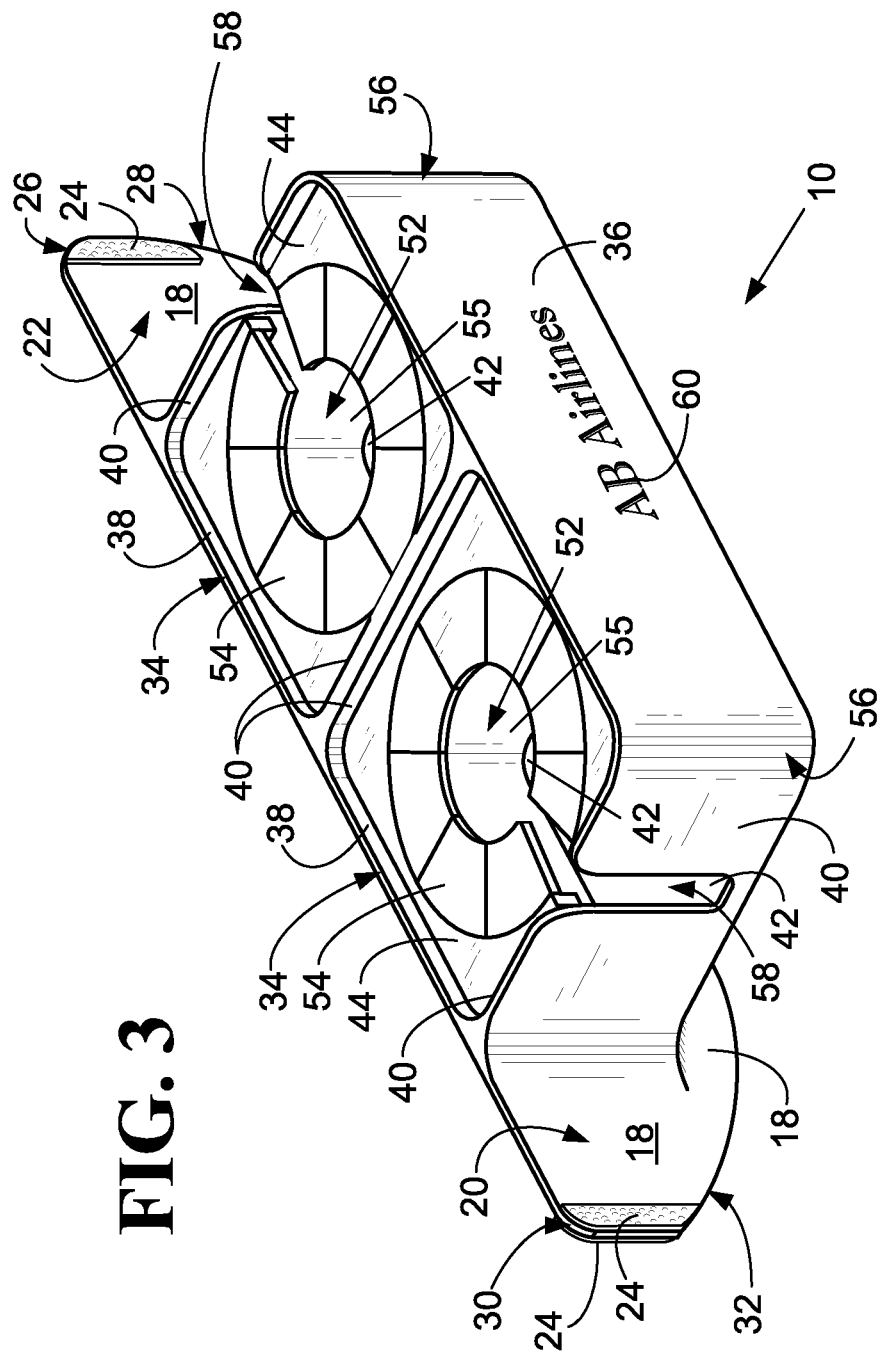
FIG. 3 is a perspective view of the first embodiment of the holder apparatus showing multiple receptacles with installed upper ends for beverage containers and/or other objects.
Figure 4:
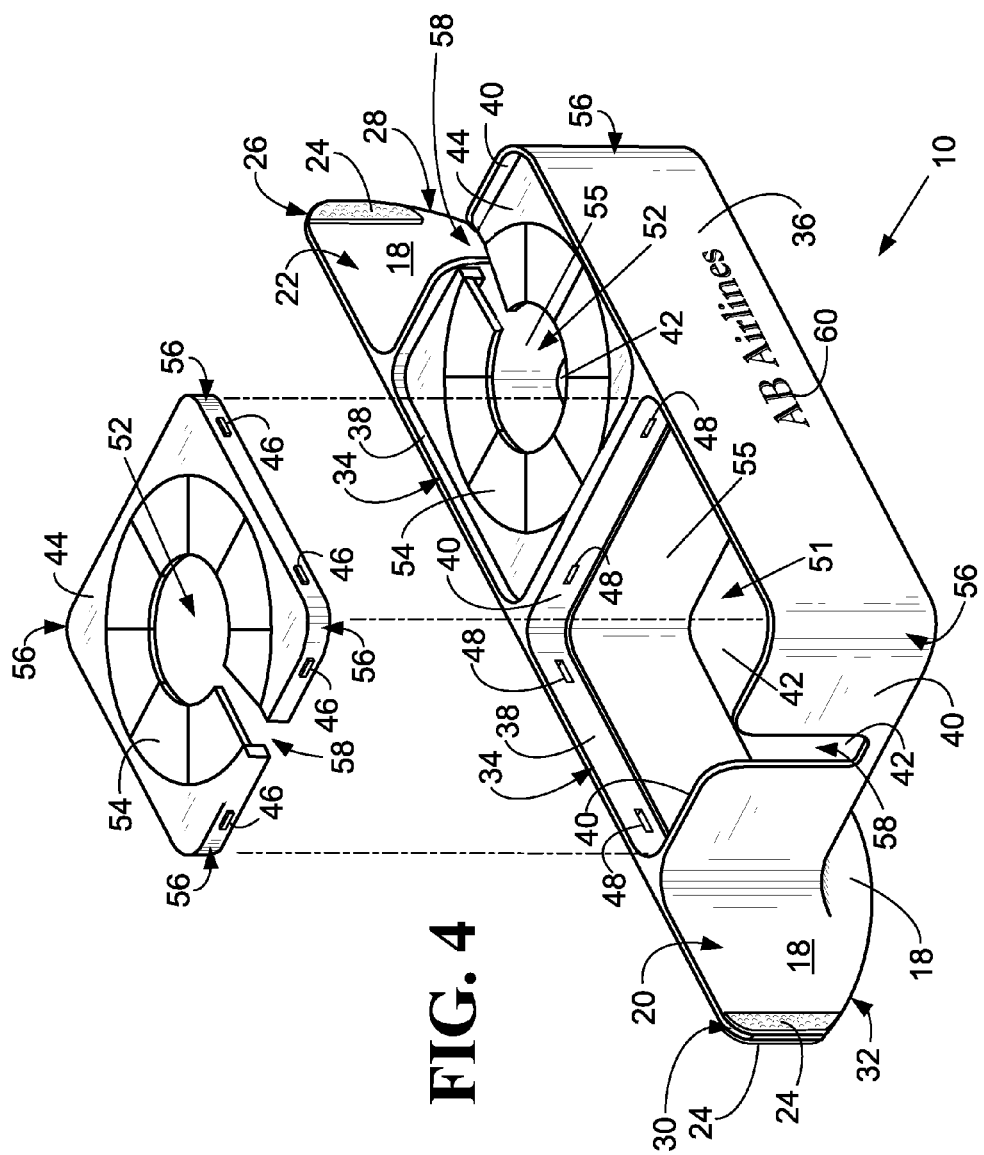
FIG. 4 is a perspective view of the first embodiment of the holder apparatus showing an exploded view of the left upper end exposing the left open-top receptacle.

Referring now to FIG. 3 and FIG. 4, the first embodiment of a stand-alone holder apparatus 10 is shown in its entirety in an uninstalled form. The holder apparatus 10 shown is comprised of mounting member 18, two receptacles 34, and two upper ends 44. Each receptacle 34 is comprised of a lower end 42, front side 36, back side 38, and a pair of opposing side ends 40, all forming primary opening 51 as illustrated in FIG. 4. Each receptacle 34 primary opening 51 is sized to hold a beverage container (not shown) such as a drinking vessel, which includes any type of beverage container that holds liquid, such as cups with or without handles, cans, bottles, glass, or any other type of container which holds liquid. Alternatively, each receptacle 34 primary opening 51 is sized to hold other objects (not shown) which includes, but not limited to, portable hand-held devices such as music players, computing devices, communication devices such as mobile telephones, cameras or video devices, writing instruments, or the like.

Each receptacle 34 primary opening 51 is sized to accept a removable upper end 44. Alternatively, the holder apparatus 10 may be constructed with a permanently attached upper end 44.

Each receptacle 34 inside surface lower end 42, front side 36, back side 38, and opposing side ends 40 inside surfaces are lined with a cushion liner material 55, such as rubber or covered foam, to cushion the shock to a beverage container or other objects in the event an airplane should encounter turbulence or any sort of uneven flight. Each receptacle 34 has a curved or angled outer corner 56 for passenger safety should a passenger make physical contact with the holder apparatus 10 when mounted in a use position. Preferably, the outer front side 36 surface of holder apparatus 10 will be adapted to display visible promotional material 60 such as passenger information, company name, advertisements, logos, or decorative images Upper end 44 is optionally attached horizontally to receptacle 34 primary opening 51 an offset distance A from the upper edge of lower end 42, front side 36, back side 38, and opposing side ends 40. Offset distance A of upper end 44 allows for catching liquid spills from a beverage container in the event an airplane should encounter turbulence or any sort of uneven flight.

Each upper end 44 has a circular secondary opening 52 therein for receiving beverage containers or other objects. Secondary opening 52 should be sized and configured to receive standard or large sized drinking cups (not shown) served on commercial airplanes. Other shapes, however, will also function to receive most standard sized beverage containers and other objects. For instance, receptacle 34 primary opening 51 and/or upper end 44 secondary opening 52 can be square, rectangle, oval, octagon or a variety of other shapes depending on the desired function for holder apparatus 10. Upper end 44 secondary opening 52 is lined with frictional strips of flexible gripping material elements 54, such as rubber, thus permitting beverage containers of various sizes to be placed within (similar to an in-sink garbage disposal) and to reduce beverage container or object movement in the event an airplane should encounter turbulence or any sort of uneven flight.

Each receptacle 34, upper end 44, and secondary opening 52 includes a handle slot 58 suitable for accepting the handle of a beverage cup (not shown). Upper end 44 may be detached from receptacle 34 should a beverage container or other object require a larger holding area than what upper end 44 secondary opening 52 can provide. The depth of receptacle 34, i.e., the distance from primary opening 51 or upper end 44 secondary opening 52, to lower end 42, should be deep enough to provide sufficient room for a beverage container to stand up in receptacle 34 without undue risk of falling or tipping over. The inventor has found that a depth of 2½ to 3½ inches is typically sufficient.

Upper end 44 is attached to receptacle 34 by means of male dimples 46 located on the upper end 44 which mate to respective female dimples 48 located on the inside wall of back side 38, front side 36, and opposing side ends 40. FIG. 4 shows an exploded view of holder apparatus 10 with upper end 44 removed exposing the location of some upper end 44 male dimples 46 and receptacle 34 female dimples 48. Upper end 44 may be attached to receptacle 34 by aligning upper end 44 sides to receptacle 34 primary opening 51, with upper end 44 handle slot 58 aligned to receptacle 34 handle slot 58, followed by fitting upper end 44 into receptacle 34 until upper end 44 male dimples 46 mate and snap into respective receptacle 34 female dimples 48.

As best shown in FIGS. 3 and 4, part of holder apparatus 10 is comprised of a generally vertical mounting member 18 comprised of mounting member left end 20 and mounting member right end 22 and one or more receptacle 34 integrated back sides 38, as such mounting member 18 is a molded integral with each receptacle 34 permanently affixed thereto during the manufacturing process. Mounting member left end 20 is used for mounting and retaining holder apparatus 10 into airplane cabin window frame window shade left U-shaped slide channel 64 and mounting member right end 22 for mounting and retaining holder apparatus 10 into a window shade right U-shaped slide channel 62. FIG. 1 shows mounting member left end 20 in a use position mounted within window shade left U-shaped slide channel 64. Likewise, FIG. 2 shows the mounting member right end 22 in a use position mounted within window shade right U-shaped slide channel 62 with FIG. 8 providing an enlarged view of this area.

Each mounting member end 20, 22 is provided with frictional slider material 24 such as a pile material, such as felt, Velcro (trademark of Velcro Corp.), or other suitable material, attached along the edge of each left and right mounting member end 20, 22. The frictional slider material 24 is optionally used in situations where airplane cabin window frame assemblies do not include pre-installed frictional slider material within each left and right U-shaped slide channel 64, 62. The friction created from the frictional slider material 24 causes holder apparatus 10 to remain in any position in which it is placed in the event that an airplane should encounter turbulence or any sort of uneven flight. For some airplane cabin window frame assembly types, which do have pre-installed frictional slider material within left and right U-shaped slide channels 64, 62, frictional slider material 24 would not be required. To illustrate where frictional slider material 24 is located on a mounting member end 22, and frictional slider material 24 relationship to a right U-shaped slider channel 62, a cross-sectional view is taken along line 7-7 of FIG. 2 with the sectional view illustrated in FIG. 7 providing a more detailed view of frictional slider material 24 with holder apparatus 10 mounted in a use position.

Figure 5:
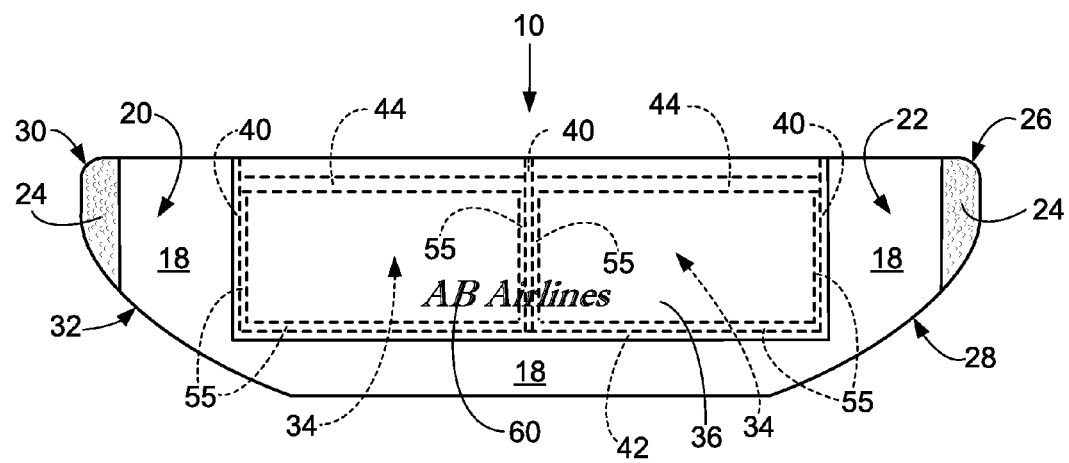
FIG. 5 is a general front view of the first embodiment of the holder apparatus.

Now referring to FIG. 5, there is shown a general front view of holder apparatus 10 which shows the proximity of receptacle 34 to mounting member 18, left mounting member end 20 and right mounting member end 22. Also illustrated are mounting member left end bottom corner 32 and mounting member right end bottom corner 28 which are curve shaped to conform to a respective bottom left corner and bottom right corner curve shape of some airplane cabin window frame assembly window shade U-shaped channel 64, 62 types. Additionally, mounting member left end top corner 30, mounting member right end top corner 26, mounting member left end bottom corner 32, and mounting member right end bottom corner 28 are each curve shaped to accommodate holder apparatus 10 installation, which method will be later described and illustrated with FIG. 13. FIG. 5 also provides a hidden line view of each receptacle 34 lower end 42, upper end 44, side ends 40, and cushion liner material 55. FIG. 5 also provides a view of frictional material 24 located on mounting member left end 20, mounting member right end 22. Also illustrated in FIG. 5 is the display of visible promotional material 60 such as passenger information, company name, advertisements, logos, or decorative images located on the outside surface of front side 36.

Figure 6:
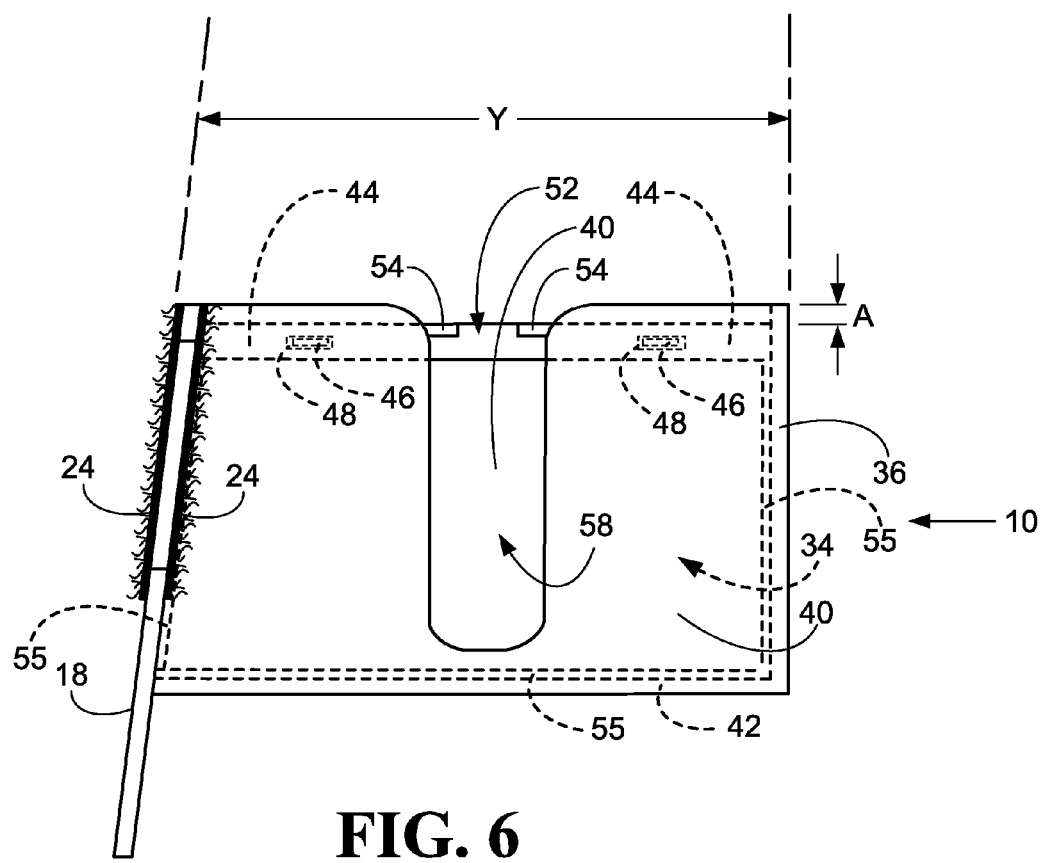
FIG. 6 is a left side view of the first embodiment of the holder apparatus.

Now referring to FIG. 6, a left side view is shown of holder apparatus 10 showing mounting member to receptacle angle Y. For those skilled in the art of conventional airplane cabin window frame assemblies, the curvature of an airplane cabin window frame assembly typically follows the curvature of an airplane fuselage. To maintain a horizontal position for each receptacle 34 primary opening 51 and/or upper end 44 secondary opening 52, when holder apparatus 10 is mounted in the use position, mounting member 18 is formed to slant at mounting member to receptacle angle Y with respect to the vertical front side 36 of receptacle 34. Also shown in FIG. 6 are see-through views of receptacle 34, front side 36, lower end 42, and upper end 44, and cushion liner material 55. Additionally, FIG. 6 illustrates handle slot 58, a left side view of frictional material 24 attached to mounting member 18 and vertical offset distance A of upper end 44 to the upper edge of receptacle 34.

Figure 9:
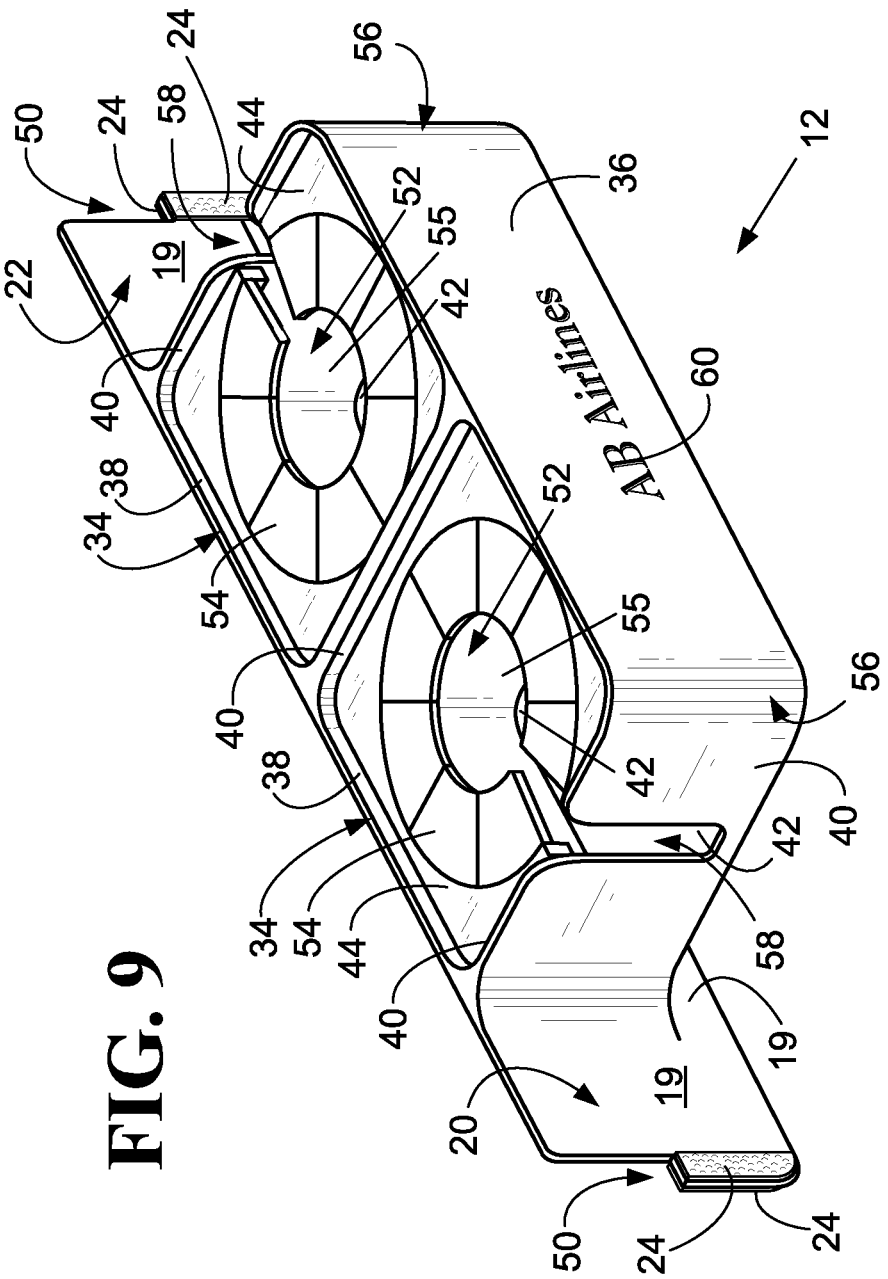
FIG. 9 is a perspective view of the second embodiment of the holder apparatus showing notched left and right mounting member ends.
Figure 10:
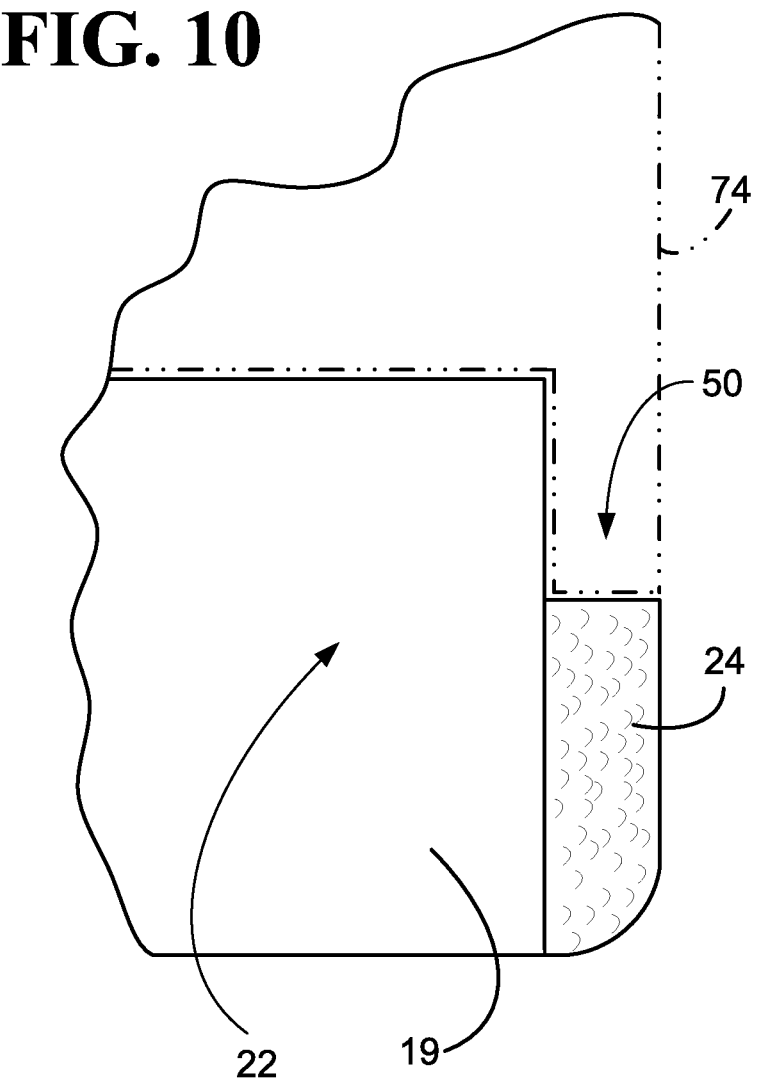
FIG. 10 is a front sectional view of the second embodiment of the holder apparatus showing the relationship of a mounting member with notch to a window shade assembly with an extended channel guide.

Now referring to FIG. 9, a second embodiment of the present invention is shown in a multiple receptacle 34 configuration and is generally referenced with the numeral 12. The second embodiment is the same as the first embodiment with the exception that holder apparatus 12 is configured with a mounting member with notch 19. Referring to FIG. 10, a sectional view of the mounting member with notch 19 is provided which includes a phantom view of a window shade frame with handle and extended channel guide 76, which is provided on some types of conventional airplane window frame assemblies, occupying right channel guide notch 50. The window shade frame with handle and extended channel guide 76 is typically located within each left and right window frame shade slide U-shaped slide channel 64, 62 where the extended channel guide portion extends below window shade leading edge 78.

Figure 11:
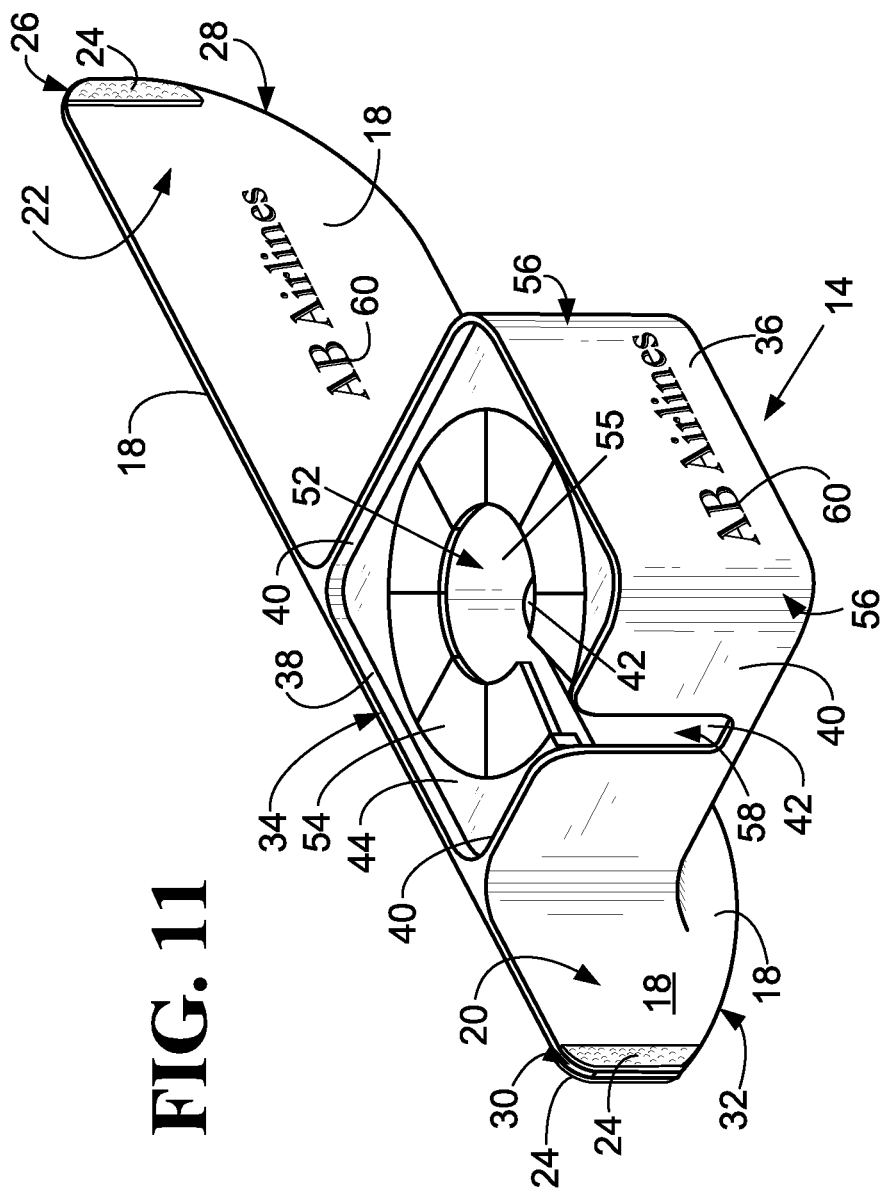
FIG. 11 is a perspective view of the third embodiment of the of the holder apparatus showing a single receptacle with upper end occupying the left side of a holder apparatus.

Now referring to FIG. 11, a third embodiment of the present invention is shown in a single receptacle 34 configuration occupying the left side of mounting member 18 and is generally referenced with numeral 14. One application for holder apparatus 14 would be a situation where an airplane cabin window frame assembly may be located to the left front of a holder apparatus 14 user who occupies a window seat on the left side of the airplane as the holder apparatus 14 user is facing the front of the airplane. In this situation, the window frame may not be located in a close proximity to the holder apparatus 14 user but instead be located in a closer proximity to the seat back of a passenger seated to the immediate front of the holder apparatus 14 user. Should the passenger seated to the immediate front of the holder apparatus 14 user choose to recline their seat back rearward, the seat back would obstruct the right portion of the window frame assembly where holder apparatus 14 is installed. In such a situation, left receptacle 34 would not be obstructed by the reclined seat back and would be available for use by the holder apparatus 14 user. Preferably, the front side 36 outer surface of holder apparatus 14, and/or mounting member 18, will be adapted to display visible promotional material 60 such as passenger information, company name, advertisements, logos, or decorative images.

A second application for the third embodiment applies to a situation where a cabin window frame assembly is located to the immediate right front of the holder apparatus 14 user who is occupying the right window seat as the holder apparatus 14 user is facing the front of the airplane. In such a situation, holder apparatus 14 provides a single receptacle 34 occupying the left side of the window frame area thus providing an open area for the passenger's right upper arm and/or shoulder to occupy the space of holder apparatus 14 not occupied by a receptacle 34.

Figure 12:
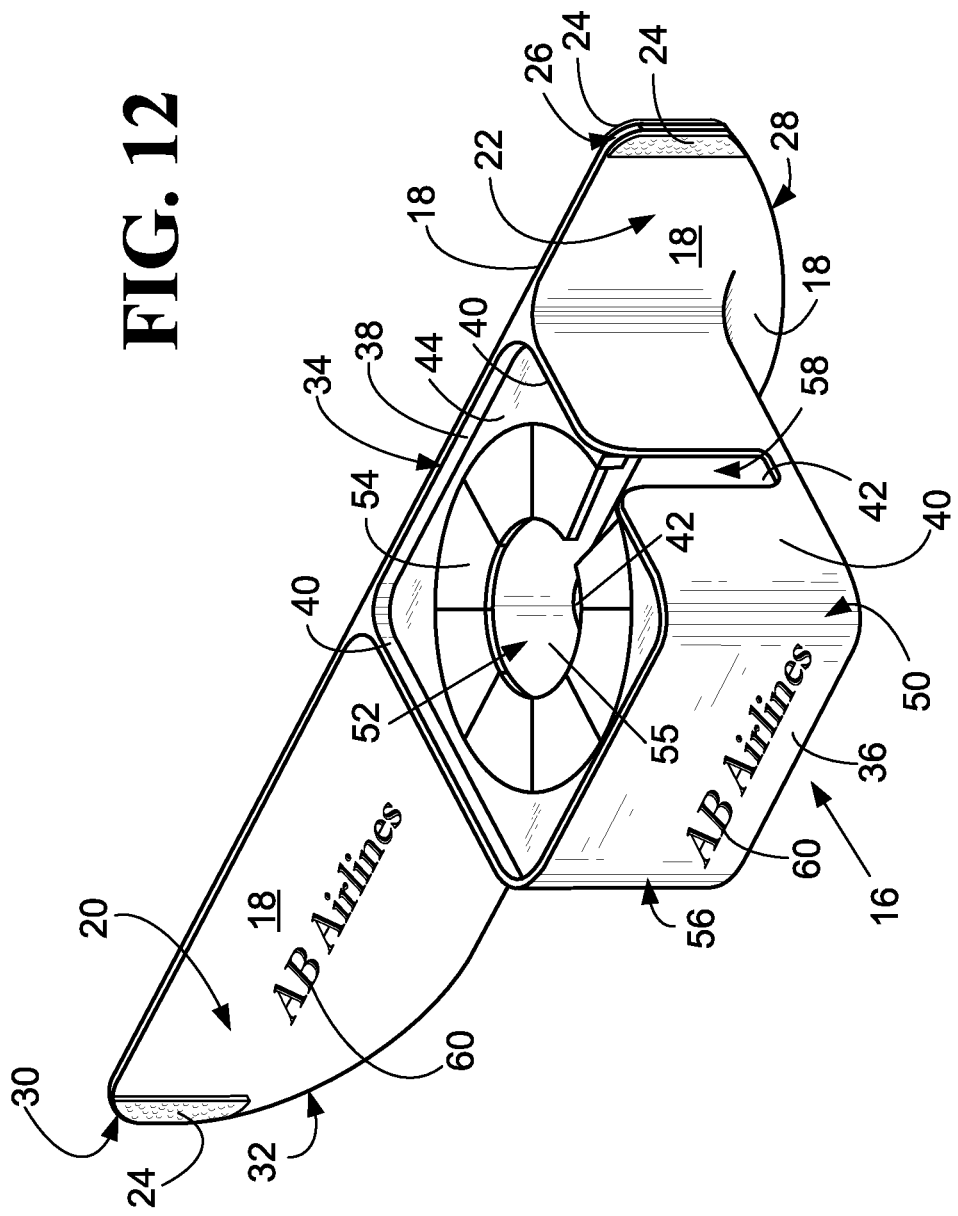
FIG. 12 is a perspective view of the fourth embodiment of the holder apparatus showing a single receptacle with upper end occupying the right side of a holder apparatus.

Now referring to FIG. 12, a fourth embodiment of the present invention is shown in a single receptacle 34 configuration occupying the right side of mounting member 18 and is generally referenced with numeral 16. One application for holder apparatus 16 would be a situation where an airplane cabin window frame assembly may be located to the right front of a holder apparatus 16 user who occupies a window seat on the right side of the airplane as the holder apparatus 16 user is facing the front of the airplane. In this situation, the window frame may not be located in a close proximity to the holder apparatus 16 user but instead be located in a closer proximity to the seat back of a passenger seated to the immediate front of the holder apparatus 16 user. Should the passenger seated to the immediate front of the holder apparatus 16 user choose to recline their seat back rearward, the seat back would obstruct the left portion of the window frame assembly where holder apparatus 16 is installed. In such a situation, right receptacle 34 would not be obstructed by the reclined seat back and would be available for use by the holder apparatus 16 user. Preferably, the front side 36 outer surface of holder apparatus 16, and/or mounting member 18, will be adapted to display visible promotional material 60 such as passenger information, company name, advertisements, logos, or decorative images.

A second application for the fourth embodiment applies to a situation where a cabin window frame assembly is located to the immediate left front of the holder apparatus 16 user who is occupying the left window seat as the holder apparatus 16 user is facing the front of the airplane. In such a situation, holder apparatus 16 provides a single receptacle 34 occupying the right side of the window frame area thus providing an open area for the passenger's left upper arm and/or shoulder to occupy the space of holder apparatus 16 not occupied by a receptacle 34.

Figure 13:
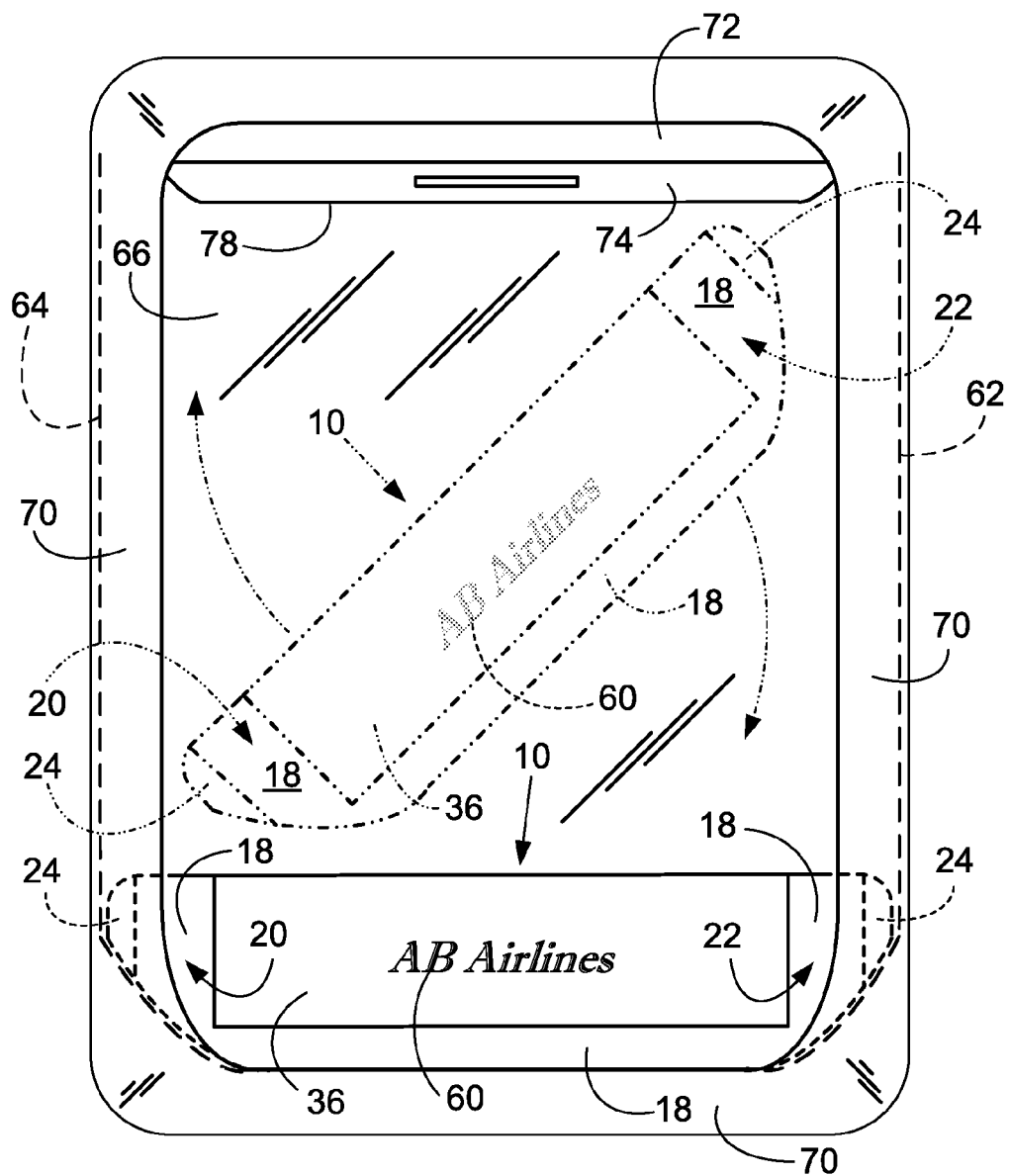
FIG. 13 is a front general view of the first embodiment of the holder apparatus showing the pre-installed and installed positions of the holder apparatus.

Referring next to FIG. 13, a front view of an airplane cabin window frame assembly is provided showing an installation method for any of the aforementioned embodiments of the holder apparatus 10, 12, 14, 16. For the purpose of this installation method description, the first embodiment of holder apparatus 10 is shown in FIG. 13. Although any of the four embodiments of the holder apparatus 10, 12, 14, 16 may satisfy other installation methods, the method illustrated in FIG. 13 requires no physical modification to any part of the airplane. A phantom line view of holder apparatus 10 is shown positioned in a pre-installed position with mounting member 18 vertically positioned parallel to the airplane window frame assembly inner window pane 66. A horizontal solid-line view of holder apparatus 10 illustrates the final installed use position. As part of the final installed position, hidden line views of left and right mounting member ends 20, 22 are provided to illustrate a the mounting member ends 20, 22 in a final use position within each respective left and right U-shaped slide channel 64, 62.

To install, holder apparatus 10 is held in one or both hands and is initially positioned to a pre-installed position with holder apparatus 10 receptacle 34 front side 36 outer surface facing toward the direction of the user passenger. With mounting member right end 22 pointing to the top right corner of the window frame, and mounting member left end 20 pointing to the bottom left corner of the window frame, align each left and right mounting member end 20, 22 edge to each respective left and right window shade left and right slide channel 64, 62 with each receptacle 34 primary opening 51 and/or upper end 44 secondary opening 52 facing in a upward position. Next, rotate holder apparatus 10 in a clockwise motion while maintaining right mounting member end 22 within right window shade right U-shaped slide channel 62 and maintaining alignment of the left mounting member end 20 within left window shade left U-shaped slide channel 64 until holder apparatus 10 is positioned horizontally. Once holder apparatus 10 is positioned horizontally, holder apparatus 10 is to be moved in a downward motion until the bottom of holder apparatus 10 is positioned at or near the bottom of the airplane cabin window frame 70. The solid-line view of holder apparatus 10 illustrates the final installed use position of holder apparatus 10 within an airplane cabin window frame assembly. After holder apparatus 10 has been placed in an installed use position, window shade frame with handle 74 may be lowered until window shade frame with handle 74 meets the horizontal top of holder apparatus 10 mounting member 18 for the purpose of reducing outside light into the airplane cabin. It should be noted that FIG. 13 rotation movement arrows illustrate a clockwise movement with the holder apparatus 10 initially positioned with each receptacle 34 primary opening 51 and/or upper end 44 second opening 52 facing the top left corner of the airplane cabin window frame assembly. However, holder apparatus 10 may be optionally positioned to a pre-installation slanted angle position where each receptacle 34 primary opening 51 and/or secondary opening 52 is facing the top right corner of the airplane cabin window frame assembly followed by a counterclockwise rotation to achieve the same horizontal installation result.

The construction of all holder apparatus 10, 12, 14, 16 embodiments described herein can be made from relatively sturdy but lightweight materials, such as a transparent, translucent, or opaque materials to include but not limited to lightweight metal, cardboard, or plastic materials which includes any class of thermoplastic or thermosetting plastics to include acrylics, polyesters, silicones, polyurethanes, polypropylene, polyethyleneterephthalate, rigid polystyrene, polycarbonate, PVC, vinyl, nylon, etc., to support the weight of one or more filled beverage containers, or other objects such as small hand-held items and the like. Such aforementioned plastic may be comprised of flame retardant, self-extinguishing, toxic, and/or non-toxic material, or any combination thereof to provide passenger safety as required.

Preferably, each holder apparatus 10, 12, 14, 16 embodiment can be made by using an injection molding process or other similar types of processes using aforementioned various plastic materials for high volume and low cost production. Preferably, each holder apparatus 10, 12, 14, 16 embodiment described herein may be formed using a suitable heat resistant plastic material or composition and such a material with a high weight-to-strength ratio so that each holder apparatus 10, 12, 14, 16 embodiment is lightweight, easy to install, and may be readily carried.

As can be appreciated from the foregoing description, the present invention provides an apparatus for holding one or more beverage containers and/or other objects. Moreover, because of the two piece construction of the present invention, all of the interaction necessary to construct such function is obtainable from two parts that can be manufactured by an injection molded process and then assembled by snap fit together without the need of complicated assembly methods.

Conclusion, Ramifications, And Scope

This concludes the description of all embodiments of the present invention. This foregoing description of one or more embodiments of the present invention has been presented for the purpose of illustration and description. While the forgoing written description of the present invention enables one of ordinary skill to make and use what is considered presently the best modes thereof, those of ordinary skill will understand and appreciate the existence of variations, combinations, and equivalents of each specific embodiment, method, and examples herein. The written description herein is not intended to be exhaustive or to limit the present invention to the precise form disclosed.

Many modifications and variations are possible in light of the above teaching, without fundamentally deviating from the essence of the present invention. It is intended that the scope of the present invention be limited not by this detailed description, but rather by all embodiments and methods within the scope and spirit of the present invention as claimed. As various changes could be made in the above constructions without departing from the scope of the present invention, it is intended that all matter contained in the above description, or shown in the accompanying drawings, shall be interpreted as illustrative and not in a limiting sense. It is therefore to be understood that within the scope of the appended claims, the present invention may be practiced otherwise than specifically described.

What is claimed as my invention is:

1. A beverage holder apparatus for a window of an airplane, the window having a first side and a second opposing side and a channel extending along the first side and the second side and configured to slidingly receive a window shade, the beverage holder, comprising:
   a mounting member, having:
   a plate member extending around a left, right, and bottom of a rear wall of a beverage receptacle and including a first end having a first extension portion and a left end edge, a second end having a second extension portion and a right end edge, the first and the second ends extending opposite each other and are configured to be removably secured to the first side and the second side of the window within the channel;
   a horizontal top configured to surround an entire periphery of the mounting member and configured to engage with a portion of the window shade;
   a first notch formed between the left end edge and the first extension portion and extending from the first end of the mounting member;

a second notch formed between the right end edge and the right extension portion and extending from the second end of the mounting member;
wherein the first notch and the second notch are configured to slidingly engage with the channel of the window;
the beverage receptacle rigidly attached to and extending from the mounting member in a direction away from the plate member, the beverage receptacle being configured to receive a beverage container;
wherein the first end and the second end are configured to securely mount respectively to the first side and the second side of the window, which in turn retains the beverage container in a fixed position relative to the window.

2. The holder apparatus of claim 1, wherein installation and removal of said holder apparatus requires no physical modifications to the airplane.

3. The holder apparatus of claim 1 further comprising:
a frictional means rigidly secured to and extending from the first end and the second end, the friction means being configured to engage with the slide and to retain the holder apparatus in a fixed position.

4. The holder apparatus of claim 1 wherein said mounting member has a curved or angled bottom left and right corners.

5. The holder apparatus of claim 1 wherein said mounting member has a curved or angled top corners.

6. The holder apparatus of claim 1, wherein the beverage receptacle includes a lower end, a front side, a back side, and a pair of opposing side ends defining one or more open-top wells providing a means to receive a beverage container or other objects.

7. The holder apparatus of claim 6, wherein the beverage receptacle said front side, said back side, and said pair of opposing side ends form an inside surface lined with a cushion liner material for gripping and/or supporting the beverage container or other objects.

8. The holder apparatus of claim 6, wherein an upper end is comprised of a circular opening adapted to receive the beverage container or other objects.

9. The holder apparatus of claim 8, wherein said circular opening is lined with an array of flexible material elements for gripping or supporting the beverage container or other objects.

10. The holder apparatus of claim 6, wherein an upper end is permanently fixed to the beverage receptacle.

11. The holder apparatus of claim 6, wherein an upper end is detachable.

12. The holder apparatus of claim 11, wherein the beverage receptacle and said upper end are assembled together by a snap fit.

13. The holder apparatus of claim 6, wherein each said front side, said back side, and said pair of opposing side ends have a top end edge wherein said upper end is recessed and attached below said top end edges of the beverage receptacle.

14. The holder apparatus of claim 6 wherein the beverage receptacle, said front side and/or said pair of opposing side ends include an upright opening defined therein;
wherein the upright opening is configured to allow a handle of a beverage container received in said receptacle to extend outwardly from said holder apparatus.

15. The holder apparatus of claim 1, wherein each outside corner of the beverage receptacle is curved or angled.

16. The holder apparatus of claim 1, wherein said holder apparatus is composed of a constructed material including at least one of plastic material, wood, or metal material.

17. The holder apparatus of claim 16 wherein said constructed material of said holder apparatus is comprised of flame retardant and/or self-extinguishing material.

18. The holder apparatus as set forth in claim 1 wherein material of said holder apparatus is comprised of toxic and/or non-toxic composition.

19. The holder apparatus as set forth in claim 1 wherein material of said holder apparatus is at least one of transparent, translucent, or opaque.

20. The holder apparatus as set forth in claim 1 wherein one or more surfaces of said holder apparatus is adaptable for displaying visible promotional material such as passenger information, company name, advertisements, logos, or decorative images thereon.

* * * * *